United States Patent Office 2,932,528
Patented Apr. 12, 1960

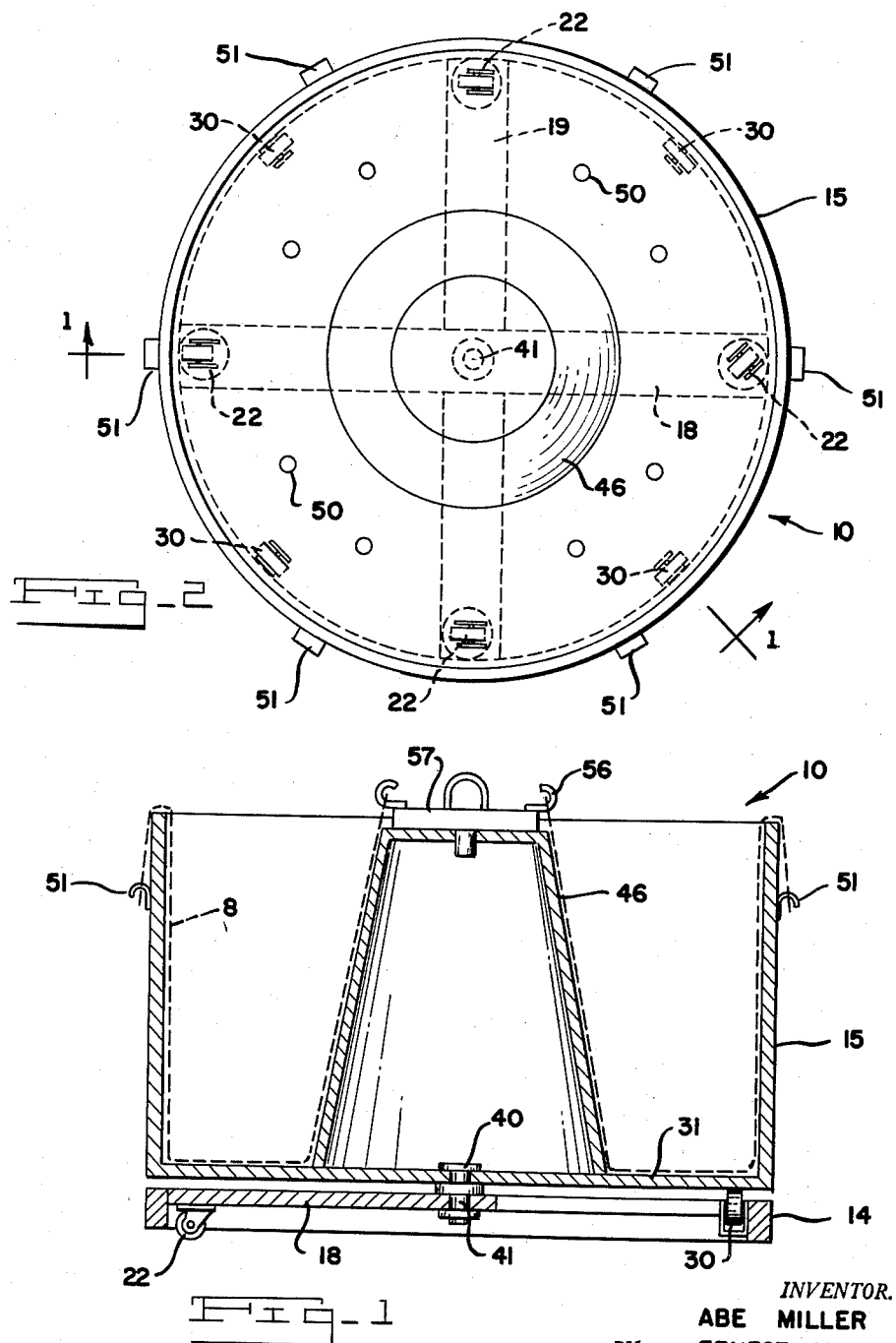

2,932,528

LOAD FORMING AND SLING LOADING CART

Abe Miller, Detroit, and Ernest Mack, Royal Oak, Mich., assignors to Miller Laundry Machinery Company, Detroit, Mich.

Application May 11, 1959, Serial No. 812,434

1 Claim. (Cl. 280—79.2)

This application relates to load forming and sling loading carts for use with laundry extractor slings and aims particularly to provide a novel form of such cart.

Objects and advantages of the invention will best be understood upon reference to the following specification and the appended drawings.

In these drawings:

Fig. 1 is a sectional view as if on line 1—1 of Fig. 2 of a novel form of cart of the invention.

Fig. 2 is a top plan view of Fig. 1.

Referring to the drawings, it will be observed that Figs. 1 and 2 show a load forming and sling loading cart 10 for use with bottom dumping flap type laundry extractor slings 8 such as are shown in Patent No. 2,904,183, dated September 15, 1959.

Fig. 4 of that patent shows how such sling is used with a load forming and loading cart and the disclosure of that patent is incorporated hereinto by reference.

These carts are normally of a diameter approximately that of the human reach, namely, 54 to 60 inches, and are normally of a height approximately that of a normal work bench, namely 27 to 30 inches.

These carts are to be loaded with wet laundry from a washing machine and it is important that the loading be carefully done so as to insure the sling being loaded evenly and with proper balance of the load so that when the wet laundry loaded sling is placed in an extractor, undue strains will not be set up because of an imbalance of the load.

Because the loaded slings are of the diameters and heights mentioned above and because of the necessity of molding the load and the sling together to form a properly balanced doughnut shaped load of approximately 60 inches in diameter and 20 inches or so in height, and because of the limitations of the human reach, special problems arise which are solved by the provision of the cart of the invention.

The cart comprises a ring frame 14 and a basket 15.

Ring frame 14 is a sturdy ring about four inches high and about 60 inches in diameter, and has reenforcing cross-members 18 and 19 which in the specific instance shown are formed as diameters. Under and secured to these cross-members and projecting downwardly are at least three, in the specific instance shown there are four, frame supporting roller casters 22 which project downwardly for portably supporting the frame on the laundry floor and enabling the frame and the basket upon it to be rolled around on the floor.

The frame also has at least three and in the specific instance, there are four, basket supporting rollers 30 secured to the frame and projecting upwardly for supporting basket 15 on and clear above and coaxial with frame 14 after the fashion of a "lazy Susan." Bottom 31 of basket 15 rests on the basket supporting rollers 30 and such bottom has a downwardly projecting pivot and securing pin 40 at its center seated in a central hole 41 of the frame reenforcing cross-members 18.

Basket 15 has a hollow frustocone 46 at its center, which projects upwardly from the basket bottom a distance of 24 inches or so as determined by the height of the outer wall of the basket which is approximately 30 inches from the floor.

The frame itself clears the floor, being supported on the casters. The basket is well clear of the frame being supported on the rollers.

The frame supporting casters 22 are spaced evenly and staggered between the basket supporting rollers 30, thus reducing the overall height of the cart. In the specific instance shown rollers 30 are mounted on the inside wall of the frame.

It will be observed that a workman standing on the outside of the basket can load wet laundry from a washing machine into a sling within the basket evenly and properly simply by rolling the basket around on the frame rollers which support the basket, the basket, pivoting on its center pivot. It is not necessary for the workmen to walk around the basket or to roll the cart on the floor as would be the case if the basket were non-rotatably fixed to the frame.

Before and after loading of the basket, the cart itself may be rolled around on the floor as desired.

Auxiliary parts are provided, namely, drain holes 50 in the bottom of the basket which drain through the ring frame; latches 51 on the outside of the basket for connecting the grommets in the upper edge of the sling temporarily to the basket during the loading operation; and hooks 56 on a plate 57 loosely supported on the top of the basket cone for connecting to grommets in the lower ends of the flaps of the sling and holding the sling properly in place in the basket during the loading operation.

Now having described the construction herein disclosed, we claim:

A laundry extractor sling load molding and load transporting cart for supporting a vertically arranged sling in position for loading laundry into the sling and for molding the load into a generally toroidal shape for fitting into an extractor machine and for transporting the loaded sling, comprising a vertically arranged cylindrically shaped basket having an open top and a closed flat bottom, a vertically arranged frustocone formed in the center of and co-axial with the basket and extending substantially the full height of the basket and being fixed to the basket at its lower, large base only and being otherwise free of connection to the walls and bottom of the basket; a basket support means comprising a ring formed of rigid material of an outside diameter substantially equal to the outside diameter of the basket, the axis of the ring being vertical and the ring having an inside and an outside wall, the ring being arranged beneath and being co-axial with the basket and having cross members extending diametrically across the ring and secured to the ring, with the top surfaces of the cross members being substantially coplanar with the top surface of the ring; roller casters secured to the cross members closely adjacent the inside wall of the ring and the lower portion of the casters extending beneath the ring a short distance for supporting the ring, but with the ring being of sufficient height to conceal within itself all but that small portion of the roller casters which extends beneath it; and support rollers secured to the inside wall of the ring and having a small portion extending above the top of the ring with the remaining portions of the support rollers being concealed within the ring; the bottom of the basket resting upon the support rollers and pin means pivotally connecting the basket at its central axis to the cross members at the central axis of the ring and the support rollers being so arranged that the basket may be rotated upon the rollers relative to the ring and the ring and basket together may be rolled upon a floor surface, whereby a cylindrically shaped sling formed with depending flaps may be inserted in the basket with its cylindrical wall in contact with the basket wall and with its flaps bent along the bottom of the basket and extending upwardly in contact with the frustocone for shaping the sling to receive a load and whereby the load may be placed into the sling while rotating the basket upon the ring for balancing the load about the sling central axis and whereby the loaded sling may then be transported within the cart.

References Cited in the file of this patent

UNITED STATES PATENTS

| | | |
|---|---|---|
| 555,550 | Yost | Mar. 3, 1896 |
| 2,588,990 | Sanchez | Mar. 11, 1952 |
| 2,711,906 | Rideout et al. | June 28, 1955 |
| 2,719,413 | Panzer | Oct. 4, 1955 |